July 5, 1955   A. S. CARDINI   2,712,470
TRUCK BODY WITH ADJUSTABLE LOAD SUPPORTING EXTENSION
Filed April 24, 1953
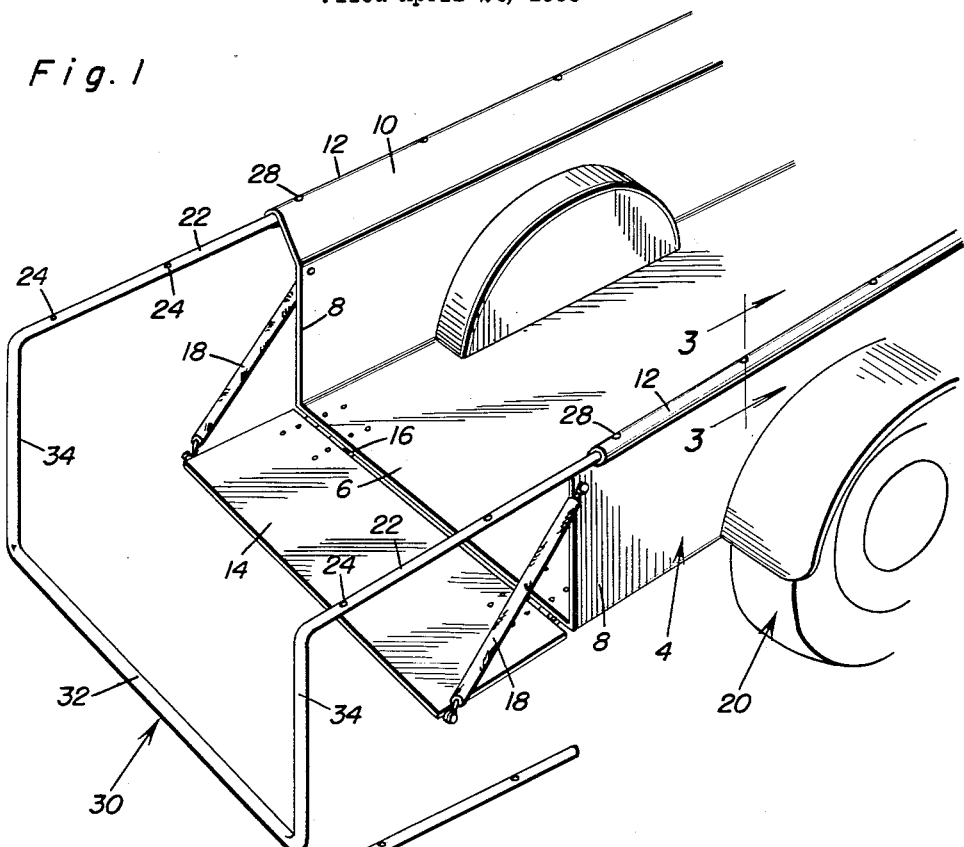
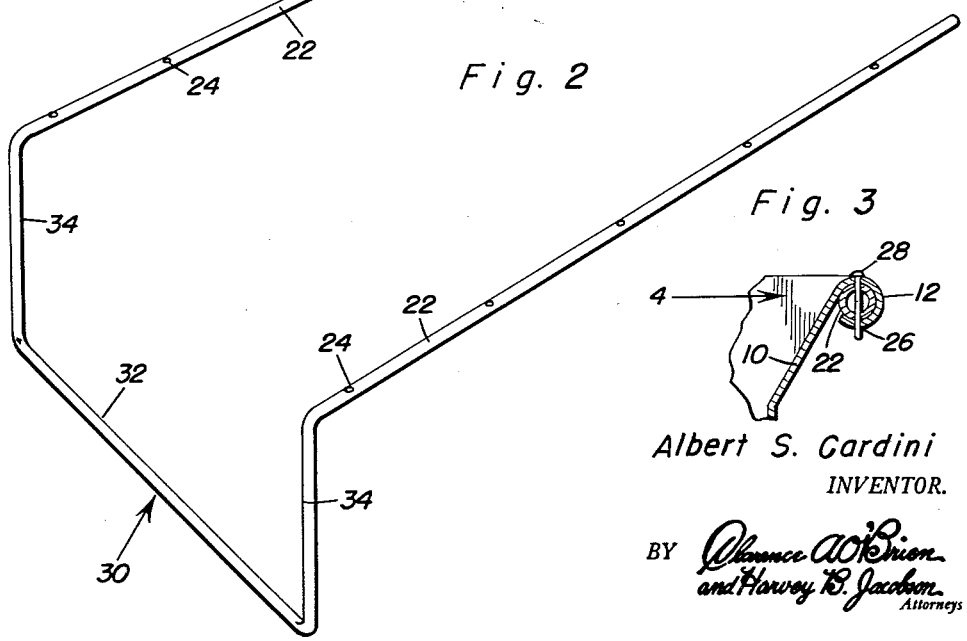
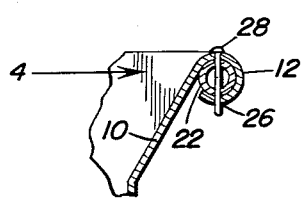
Albert S. Cardini
INVENTOR.

United States Patent Office 2,712,470
Patented July 5, 1955

2,712,470

TRUCK BODY WITH ADJUSTABLE LOAD SUPPORTING EXTENSION

Albert S. Cardini, Ironwood, Mich.

Application April 24, 1953, Serial No. 350,857

3 Claims. (Cl. 296—26)

The present invention relates to a projectible and retractable load handling extension which is aptly and suitably constructed for use on and in conjunction with a light load pick-up truck, for example, a one-half ton truck.

The obvious objective and consequent purpose of the invention is to equip a truck of the stated type with an auxiliary device which in the instant situation takes the form of a simple, economical and practical frame, said frame cooperating with the tail gate when the latter is down and the frame is out to permit the body to then be used to haul an extra load, a load which does not over-tax the load capacity of the truck but which, because of the length of the members carried, makes it easy to do so.

It is an object of the instant invention to structurally, functionally and otherwise improve upon the similarly constructed and performing prior art truck extensions and in doing so, to provide one of comparatively simple nature in which manufacturers, retailers and hauling companies and others will find their respective requirements and needs satisfactorily met.

In carrying out a preferred embodiment of the instant invention, an unusually simple frame is employed. The rear end of the frame is of vertical U-shaped form and there are horizontal arms provided which fit telescopically into existing tubular beads or members as already available in small pick-up truck constructions. The arms are telescopically fitted and are locked in place by insertable and removable retaining pins. The bight portion of the U-shaped portion is preferably in a plane with the end gate when the latter is let down and suspended in its level horizontal position.

Other objects, features and advantages will become more readily apparent from the following description and the accompanying sheet of drawings.

In the accompanying drawings wherein like numerals are employed to designate like parts throughout the same:

Figure 1 is a perspective view of fragmentary type showing a truck of the stated pick-up half-ton capacity slightly revamped and including the extra load extension means;

Figure 2 is a perspective view of the part which is called the frame; and

Figure 3 is a fragmentary enlarged section on the vertical line 3—3 of Figure 1, looking in the direction of the arrows.

With reference first to Figure 1, the light duty half-ton pick up truck with which the invention is generally used is denoted, generally speaking, by the numeral 4. It includes a bottom 6 and upstanding vertical or longitudinal side walls 8—8 having outwardly flaring flanges 10—10 at their upper ends forming a sort of a hopper construction. The extreme upper ends of the flanges are turned, as usual, to form tubular beads or reinforcing members, as at 12, and these are open at their rear ends and function as sleeve-like bearings for a complemental extension frame. The tail gate, which is conventional, is denoted by the numeral 14 and is hinged in place as at 16, and the usual suspension chains 18—18 are provided to suspend the tail gate in its open load carrying position in the manner shown in Figure 1. One wheel is denoted by the numeral 20.

The adjustable or extensible and contractable auxiliary or extra load accommodating and carrying frame is a one-piece member and is preferably formed from a single length of rod or metal tube or pipe of appropriate cross-sectional gauge. The elongated horizontal spaced parallel arm portions 22—22 are fitted telescopically into the bearings 12 and are provided at longitudinally spaced points with keeper holes 24—24 which register with additional holes 26 provided in the bearings whereby to accommodate the insertable and removable keeper pins 28 which, when in place as shown in Figure 3, serve to either fasten the frame in its completely retracted out-of-the-way position or in its extended position. In the drawings in Figure 1, it is shown in its extended load carrying position. This is not the extreme "out" position, but what may be considered as an intermediate position. This is the "adjustable" feature. The intermediate portion of the frame is U-shaped as generally denoted by the numeral 30 and it, therefore, includes a horizontal bight portion 32 which, in actual use is approximately level or in a plane with the end gate 14. It also includes vertical depending limb portions 34—34 which are joined at right angles with the trailing ends of the telescoping adjustably attached arms 22—22.

It will be evident that a truck having this additional frame unit is thus greatly improved. That is to say, the degree of usefulness or capacity of the truck is enlarged upon because in many instances it is desirable to stack long but relatively light weight studs, timbers, small-trunk trees, etc., in the truck. Where the truck would ordinarily be too short to carry such a load, with the extended frame in position it at once becomes a satisfactory carrying vehicle for a load of the kind specified. Novelty is predicated on the combination of features seen in Figure 1, on the one hand, and the frame, as an attachment, as shown in Figure 2.

From the foregoing, the construction and operation of of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination, a wheel supported truck body having a closable tail gate opening at the rear loading and unloading end, said body having a horizontal bottom wall, a pair of spaced parallel side walls joined with and rising vertically from said bottom wall, the upper lengthwise edge portions of said side walls having horizontally disposed tubular reinforcing members which are open at their rear ends, said reinforcing members constituting sleeve-like elongate bearings, a tail gate hinged to said bottom wall at the open rear end of the body, means suspending the tail gate in an open position which is coplanar with said bottom wall, an extra load carrying device embodying a frame, and said frame having coplanar spaced parallel elongate horizontally disposed arms fitting snugly but telescopically and slidably into said bearing members, said frame also including a depending U-shaped member which is directly cooperable with the open tail gate, said member having a bight portion which is disposed in spaced parallelism rearwardly of and coplanar with said tail gate and is adjustable by way of the sliding movement of the arms in the bearing members toward and from the rear trailing end of said gate, and vertical limbs at right angles to and joined with the trailing ends of said arms, said limbs being equal in length to the depth of said body, said arms and bearing members constituting the primary means for supporting said device separably and detachably on said body.

2. The structure defined in claim 1, and wherein said bearing members are provided with longitudinally spaced selectively usable keeper holes, said arms being provided with keeper holes alignable selectively with the first named keeper holes, and readily insertable and removable keeper pins fitted into aligned holes in said arms and bearing members and adjustably securing the device in place.

3. An attachment for a light weight pick-up truck wherein the truck has side walls formed with lengthwise tubular bearings; comprising a device which is readily applicable and removable, said device comprising, in turn, a pair of relatively long coplanar spaced parallel arms adapted to be fitted telescopically into the aforementioned tubular members with the rear end portions of the arms extending beyond the corresponding ends of the tubular members, a depending substantially U-shaped member having a rigid linearly straight bight portion which is adapted to be in a plane substantially level with an open tail gate, and vertical limbs rising laterally from said bight portion and having their upper ends rigidly joined with the rear ends of said arms.

References Cited in the file of this patent
UNITED STATES PATENTS

| | | |
|---|---|---|
| 1,504,679 | Dietz | Aug. 12, 1924 |
| 2,152,804 | Hays | Apr. 4, 1939 |
| 2,324,508 | Johnson | July 20, 1943 |
| 2,468,579 | Vuori | Apr. 26, 1949 |
| 2,549,938 | Seaman, Jr. | Apr. 24, 1951 |
| 2,556,130 | Whittington | June 5, 1951 |